(12) United States Patent
Dziuba et al.

(10) Patent No.: US 12,355,368 B2
(45) Date of Patent: Jul. 8, 2025

(54) ADAPTIVE PULSE WIDTH MODULATION OVERMODULATION IN THREE-PHASE VOLTAGE SOURCE INVERTERS

(71) Applicant: Karma Automotive LLC, Irvine, CA (US)

(72) Inventors: Robert Dziuba, Irvine, CA (US); Fazel Farahmand, Aliso Viejo, CA (US); Sina Hamzehlouia, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 252 days.

(21) Appl. No.: 18/309,471

(22) Filed: Apr. 28, 2023

(65) Prior Publication Data

US 2024/0364236 A1 Oct. 31, 2024

(51) Int. Cl.
*H02M 7/5395* (2006.01)
*H02M 1/00* (2006.01)
*H02P 27/08* (2006.01)

(52) U.S. Cl.
CPC ....... *H02M 7/5395* (2013.01); *H02M 1/0025* (2021.05); *H02P 27/08* (2013.01)

(58) Field of Classification Search
CPC .... H02M 7/5395; H02M 1/0025; H02P 27/08
See application file for complete search history.

(56) References Cited

U.S. PATENT DOCUMENTS

| | | | |
|---|---|---|---|
| 11,190,125 B2 * | 11/2021 | Kajino | B60K 6/442 |
| 2021/0087985 A1 * | 3/2021 | Tanaka | B60L 15/08 |
| 2024/0223117 A1 * | 7/2024 | Dziuba | B60L 15/02 |

FOREIGN PATENT DOCUMENTS

JP 2015091161 A 5/2015

OTHER PUBLICATIONS

International Search Report and Written Opinion (EPO) for Application PCT/US2024/025790 dated Aug. 5, 2024.
(Continued)

*Primary Examiner* — Adolf D Berhane
(74) *Attorney, Agent, or Firm* — Honigman LLP; Thomas J. Appledorn; Grant Griffith

(57) ABSTRACT

A method includes voltage vector command values for an electric motor implemented on a vehicle and operating in a linear region. The method also includes receiving system state information of the vehicle and determining that an overmodulation threshold is satisfied based on the system state information of the vehicle. Based on determining that the overmodulation threshold is satisfied, the method includes determining a modulation factor from a modulation index, generating a three-phase output based on the voltage vector command values and the modulation factor, and determining a plurality of control signals based on the three-phase output. Each respective control signal of the plurality of control signals corresponds to a respective switch among a plurality of switches of an inverter. The method also includes instructing the plurality of switches of the inverter to control operation of the electric motor in the overmodulation region based on the plurality of control signals.

20 Claims, 13 Drawing Sheets

(56) References Cited

OTHER PUBLICATIONS

Bakhshai A R et al: "Incorporating the Overmodulation Range in Space Vector Pattern Generators Using a Classification Algorithm", PESC Record 97:28th Annual IEEE Power Electronics Specialists Conference. St. Louis, Jun. 22-27, 1997; [Annual IEEE Power Electronics Specialists Conference (PESC)], New York, IEEE, US, vol. Conf. 28, Jun. 22, 1997 (Jun. 22, 1997), pp. 1007-1013, XP001066619, ISBN: 978-0-7803-3841-8.

Jankovic Zeljko et al: "Dynamic Discontinuous PWM for Grid-tied Inverter Applications", 2020 IEEE Energy Conversion Congress and Exposition (ECCE), IEEE, Oct. 11, 2020 (Oct. 11, 2020), pp. 5032-5039, XP033851038, DOI: 10.1109/ECCE44975.2020. 0236024 [retrieved on Oct. 21, 2020].

Mohapatra, K. K. et al. "A Harmonic Elimination and Suppression Scheme for an Open-End Winding Induction Motor Drive" IEEE Transactions on Industrial Electronics, 50(6), 1187-1198. https://doi.org/10.1109/TIE.2003.819670. (2003).

Oleschuk, V. et al. "Fast algorithms of modulation of inverter output voltage for induction motor drive". IEEE International Symposium on Industrial Electronics, 2, 801-805. https://doi.org/10.1109/ISIE.1999.798716. (1999).

Chung, D. W. et al. "Unified PWM technique for real time power conversion". Proceedings of Power Conversion Conference—PCC '97, 1, 265-270. https://doi.org/10.1109/PCCON.1997.645623. (1997).

Liu, K. "A constrained optimization approach to the control of inverters: Beyond the PWM technique". 2009 ICCAS—SICE. (2009).

Nguyen, T. H. et al. "Control Mode Switching of Induction Machine Drives between Vector Control and V/ f Control in Overmodulation Range". Journal of Power Electronics, 11(6), 846-855. https://doi.org/10.6113/JPE.2011.11.6.846. (2011).

Shimaoka, M. et al. "The characteristic evaluation of the method to improve the voltage phase resolution of model predictive control for current control system of PMSM". 2017 IEEE 3rd International Future Energy Electronics Conference and ECCE Asia, IFEEC—ECCE Asia 2017, 1641-1645. https://doi.org/10.1109/IFEEC.2017.7992293. (2017).

Aravind, M. et al. "FPGA based Synchronized Sinusoidal Pulse Width Modulation with smooth transition into overmodulation and six step modes of operation for three phase AC motor drives". PEDES 2012—IEEE International Conference on Power Electronics, Drives and Energy Systems. https://doi.org/10.1109/PEDES.2012.6484277. (2012).

Narayanan, G. et al. "Synchronised Bus-Clamping PWM Strategies based on Space VectorApproach for Modulation upto Six-Step Mode". IEEE 10.1109/PEDES.1998.1330737. (1998).

Young, P. et al. "Optimal generalized overmodulation for multiphase PMSM drives" Conference Proceedings—IEEE Applied Power Electronics Conference and Exposition—APEC, 500-505. https://doi.org/10.1109/APEC.2017.7930740. (2017).

\* cited by examiner

ADAPTIVE PULSE WIDTH MODULATION OVERMODULATION IN THREE-PHASE VOLTAGE SOURCE INVERTERS

TECHNICAL FIELD

This disclosure relates to adaptive pulse width modulation overmodulation in three-phase voltage source inverters.

BACKGROUND

Electric motors are controlled using power from an energy storage device (e.g., battery), in which an inverter converts direct current (DC) power stored in the energy storage device into three-phase alternative current (AC) power to operate the electric motor. The inverter includes a plurality of switching devices controlled via pulse width modulation (PWM) for generating the AC power. A major drawback of operating electric motors using PWM is that the inverter generates an output voltage that is less than a total input voltage supplied to the inverter by the battery. As such, the electric motors are unable to leverage the full power of the battery during PWM control.

SUMMARY

One aspect of the disclosure provides a computer-implemented method that when executed on data processing hardware causes the data processing hardware to perform operations for performing adaptive pulse width modulation overmodulation. The operations include receiving voltage vector command values for an electric motor implemented on a vehicle and operating in a linear modulation region. The operations also include receiving system state information of the vehicle and determining that an overmodulation threshold is satisfied based on the system state information of the vehicle. Based on determining that the overmodulation threshold is satisfied, the operations include determining a modulation factor from a modulation index, generating a three-phase output based on the voltage vector command values and the modulation factor, determining a plurality of control signals based on the three-phase output. Here, the three-phase output corresponds to the electric motor operating in an overmodulation region and each respective control signal of the plurality of control signals corresponds to a respective switch among a plurality of switches of an inverter. The operations also include instructing the plurality of switches of the inverter to control operation of the electric motor in the overmodulation region based on the plurality of control signals.

Implementations of the disclosure may include one or more of the following optional features. In some implementations, the operations further include determining a time period that the electric motor has been operating in the overmodulation region, determining that the time period satisfies a threshold time period, and instructing the electric motor to cease operating in the overmodulation region and operate in the linear modulation region based on determining that the time period satisfies the threshold time period. In some examples, generating the three-phase output generating the three-phase output using a fixed-magnitude value. The system state of the vehicle may include at least one of a torque request, a brake request, a traction control request, a collision avoidance request, a battery limp request, or a global position system (GPS) signal of the vehicle.

In some implementations, determining that the overmodulation threshold is satisfied based on the system state information of the vehicle includes determining that a rate of change of a torque request satisfies the overmodulation threshold. In other implementations, determining that the overmodulation threshold is satisfied based on the system state information of the vehicle includes determining a collision avoidance request satisfies the overmodulation threshold. In some examples, the modulation factor corresponds to a maximum output voltage applied at the electric motor. The plurality of switches may include a first pair of switches corresponding to a first output node of the inverter, a second pair of switches corresponding to a second output node of the inverter, and a third pair of switches corresponding to a third output node of the inverter. In some implementations, the operations further include determining an angle shift based on the system state information of the vehicle. In these implementations, determining the plurality of control signals is further based on the angle shift.

Another aspect of the disclosure includes a vehicle. The vehicle includes an electric motor, an inverter, data processing hardware, and memory hardware. The memory hardware is in communication with the data processing hardware and storing instructions that when executed on the data processing hardware causes the data processing hardware to perform operations storing instructions that when executed on the data processing hardware causes the data processing hardware to perform operations for performing adaptive pulse width modulation overmodulation. The operations include receiving voltage vector command values for the electric motor operating in a linear modulation region. The operations also include receiving system state information of the vehicle and determining that an overmodulation threshold is satisfied based on the system state information of the vehicle. Based on determining that the overmodulation threshold is satisfied, the operations include determining a modulation factor from a modulation index, generating a three-phase output based on the voltage vector command values and the modulation factor, determining a plurality of control signals based on the three-phase output. Here, the three-phase output corresponds to the electric motor operating in an overmodulation region and each respective control signal of the plurality of control signals corresponds to a respective switch among a plurality of switches of the inverter. The operations also include instructing the plurality of switches of the inverter to control operation of the electric motor in the overmodulation region based on the plurality of control signals.

Implementations of the disclosure may include one or more of the following optional features. In some implementations, the operations further include determining a time period that the electric motor has been operating in the overmodulation region, determining that the time period satisfies a threshold time period, and instructing the electric motor to cease operating in the overmodulation region and operate in the linear modulation region based on determining that the time period satisfies the threshold time period. In some examples, generating the three-phase output generating the three-phase output using a fixed-magnitude value. The system state of the vehicle may include at least one of a torque request, a brake request, a traction control request, a collision avoidance request, a battery limp request, or a global position system (GPS) signal of the vehicle.

In some implementations, determining that the overmodulation threshold is satisfied based on the system state information of the vehicle includes determining that a rate of change of a torque request satisfies the overmodulation threshold. In other implementations, determining that the overmodulation threshold is satisfied based on the system state information of the vehicle includes determining a collision avoidance request satisfies the overmodulation threshold. In some examples, the modulation factor corresponds to a maximum output voltage applied at the electric motor. The plurality of switches may include a first pair of switches corresponding to a first output node of the inverter, a second pair of switches corresponding to a second output node of the inverter, and a third pair of switches corresponding to a third output node of the inverter. In some implementations, the operations further include determining an angle shift based on the system state information of the vehicle. In these implementations, determining the plurality of control signals is further based on the angle shift.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
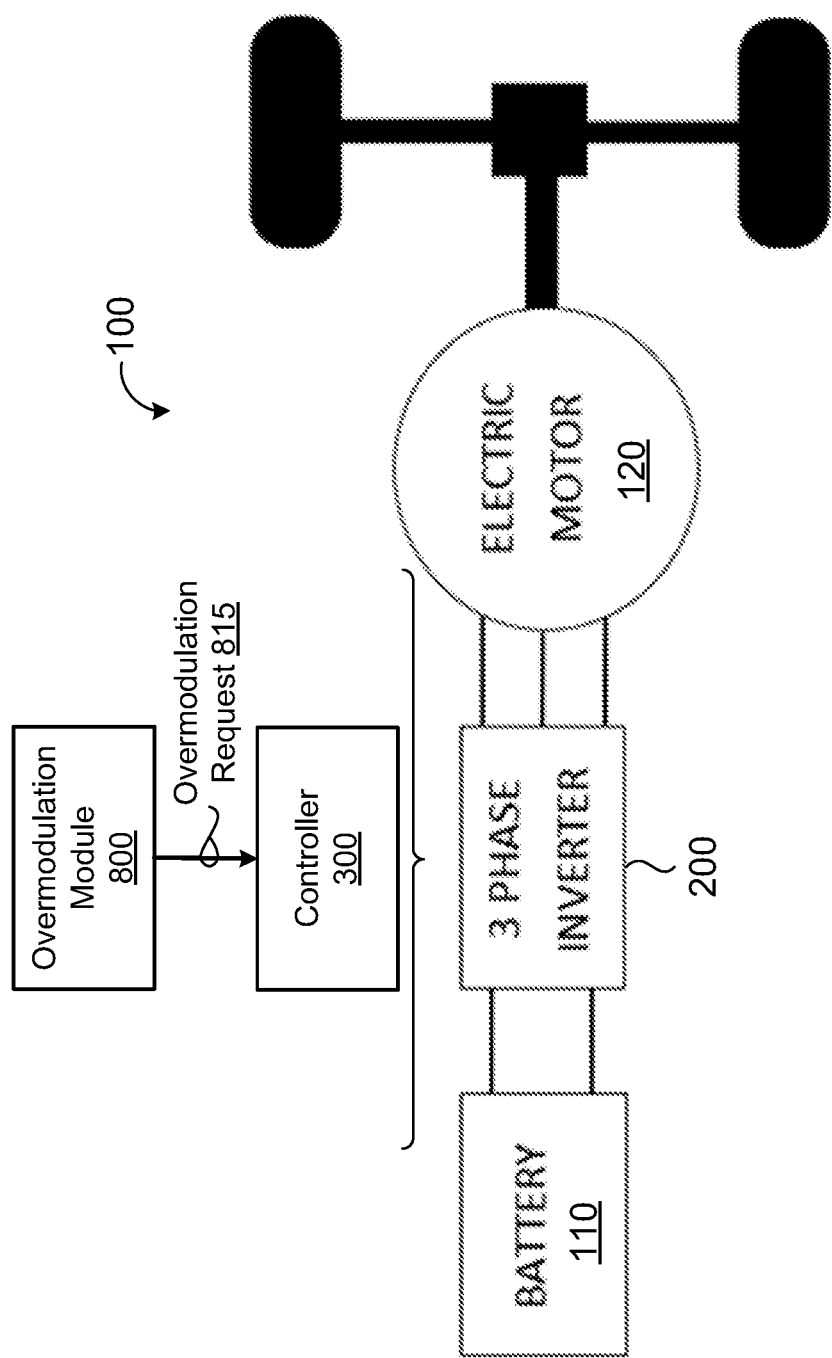
FIG. 1 is a schematic view of an electric drive system including an energy storage device, a three-phase inverter, and an electric motor.

Systems for controlling electric motors for electric vehicles usually include a power storage device (e.g., battery), an inverter, one or more electric motors, and a controller. Here, the power storage device provides direct current (DC) power while the one or more electric motors require three-phase alternating current (AC) power for operation. Thus, the inverter converts the DC power provided by the power storage device into three-phase AC power thereby powering the one or more electric motors. In particular, the inverter includes a controller that instructs a switching state (e.g., open or closed) for each of a plurality of switches of the inverter (e.g., six (6) switches). Stated differently, the controller instructs the plurality of switches to open or close via a pulse width modulation (PWM) control signals whereby AC power is output from the inverter. At any given time step, three (3) of the switches maybe open while the other three (3) of the switches are closed. As such, the PWM control signals adjust the time (duty cycle) during which the switches are open and closed. The PWM control signals may include sinusoidal, chirp, or square waves. Thus, the inverter generates three separate AC power signals (e.g., three-phase output) separated by one-hundred and twenty degrees phase angle to control the three-phase electric motors. However, switching the plurality of switches of the inverter results in switching losses thereby reducing the efficiency of the inverter.

Discontinuous pulse width modulation (DPWM) is a modulation technique for inverters driving electric motors whereby the inverter clamps two (2) of the six (6) switches to a positive terminal or a negative terminal of the DC bus voltage (e.g., the battery) while the inverter continues to modulate the other four (4) switches using PWM. As such, the AC power signals corresponding to the clamped switches are altered from the sinusoidal wave and are held at the constant value of either the positive battery terminal or the negative battery terminal during the claiming period. As used herein, clamping switches to the DC bus voltage is referred to as "clamping." In three-phase DPWM, one phase (e.g., one switch) is always clamped to either the positive terminal or the negative terminal of the DC bus voltage. In some examples, the inverter clamps two (2) of the switches for one-third of a period of the PWM signal. As such, the inverter generates a third harmonics signal purposely to saturate PWM signals and reduce a number of switching events for the switches of the inverter while maintaining the same output phase-to-phase voltage values. As a result, the inverter may turn off switching for each phase (e.g., each pair of switches) for two (2) of eight (8) switching states. Although, in some examples, only six (6) of the eight (8) switching states are needed to produce AC power. However, clamping each phase arbitrarily or based on voltage does not optimally minimize the switching losses of the inverter.

Operating the inverter using PWM techniques such as space vector PWM (SVPWM) or DPWM modulation only utilizes a portion of the total input power from the battery (e.g., linear modulation region). For example, the inverter may only apply about 90% of the battery's voltage to the electric motors whereby the remaining 10% of the battery's voltage remains unused. In contrast, operating the inverter using overmodulation allows the inverter to apply the entirety of the input voltage of the battery (e.g., overmodulation region) to the electric motor(s) generating additional torque otherwise unavailable during SVPWM or DPWM operation. However, operating the inverter using overmodulation is not without consequences. Namely, overmodulation increases the thermal load on the inverter and electric motors and creates oscillations in the electric motor causing vibrations. Thus, electric motors should only operate in the overmodulation region when the additional torque is necessary to avoid the consequences caused by the overmodulation.

Accordingly, implementations herein are directed towards methods and systems (e.g., electric vehicle) for performing adaptive PWM overmodulation in three-phase voltage source inverters. For example, the PWM overmodulation may be implemented for inverters controlling electric motors of an electric vehicle. The inverter includes a controller that receives voltage vector command values for an electric motor operating in a linear modulation region and receives system state information of the vehicle. The system state information may include, but is not limited to, acceleration requests, collision avoidance requests from an autonomous vehicle controller, and regenerative braking requests. Thus, the controller may determine whether the additional torque of the electric motor available during overmodulation is required based on determining whether an overmodulation threshold is satisfied based on the system state information. For instance, in response to the collision avoidance request, the controller may determine that overmodulation of the electric motors is required to enable a wider range of maneuvers of the electric vehicle to avoid a collision. Based on determining that the overmodulation threshold is satisfied, the controller determines a modulation factor from a modulation index, generates a three-phase output, and determines a plurality of control signals based on the three-phase output. Thereafter, the controller instructs the plurality of switches of the inverter to control operation of the electric motor in the overmodulation region based on the plurality of control signals. As will become apparent, the controller may apply overmodulation in addition to, or in lieu of, applying DPWM. Thus, by applying both overmodulation and DPWM, the electric motor may produce additional torque while also reducing the switching frequency to improve efficiency.

FIG. 1 shows an example electric drive system 100 of an electric vehicle. The example electric drive system 100 may correspond to any electric vehicle, for example, a battery electric vehicle (BEV), a hybrid electric vehicle (HEV), or a plug-in hybrid electric vehicle (PHEV). The electric drive system 100 includes one or more batteries (e.g., battery pack) 110 each storing energy that can be used by the electric motors 120. The battery 110 provides a direct current (DC) voltage output and is electrically connected to a three-phase inverter 200 and one or more electric motors 120. For sake of clarity, FIG. 1 shows one battery 110 and one electric motor 120 only. However, it is understood the electric drive system 100 may include any number of batteries and any number of electric motors 120 (e.g., one electric motor for each wheel of the electric vehicle). The vehicle also includes an overmodulation module 800 in communication with the controller 300 and configured to operate the electric motor(s) 120 in an overmodulation region. Operating the electric motor(s) 120 in the overmodulation region is described in greater detail below with reference to FIG. 8.

The three-phase inverter 200 (also referred to as simply "inverter 200") is also electrically connected to the one or more electric motors 120 and is configured to transfer energy between the battery 110 and the electric motors 120. The electric motors 120 may require a three-phase alternating current (AC) output, and thus, the inverter 200 converts the DC voltage from the battery 110 to the three-phase AC output for the electric motors 120. The electric motors may be configured to generate torque by receiving the three-phase AC output from the inverter 200 to drive wheels of the electric vehicle. The electric motors 120 may include rotational angle sensors 130 (FIG. 2) that detect the rotational position of a rotor of the electric motor 120 and continuously output the rotational position of the rotor.

The battery 110 may include a plurality of battery cells including a variety of chemical formulations. For example, battery cell chemical formulations may include, but are not limited to, lead acid, nickel cadmium (NiCd), nickel-metal hydride (NIMH), Lithium-Ion, or Lithium-Ion polymer. Each battery 110 may include a single battery cell or multiple battery cells electrically connected in parallel. On the other hand, each battery 110 may include a single battery cell or multiple battery cells connected in series, in parallel, or some combination thereof.

The battery 110 may include a battery controller that monitors and controls the performance of the battery 110. For instance, the battery controller may include a current sensor that measures the battery state of charge and capacity. The current sensor may utilize a variety of methods based on physical principles to detect the current including a Hall Effect integrated circuit (IC) sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the battery control module may disconnect the battery cell via the use of a circuit interrupt device (CID) such as a fuse or circuit breaker.

Figure 2:
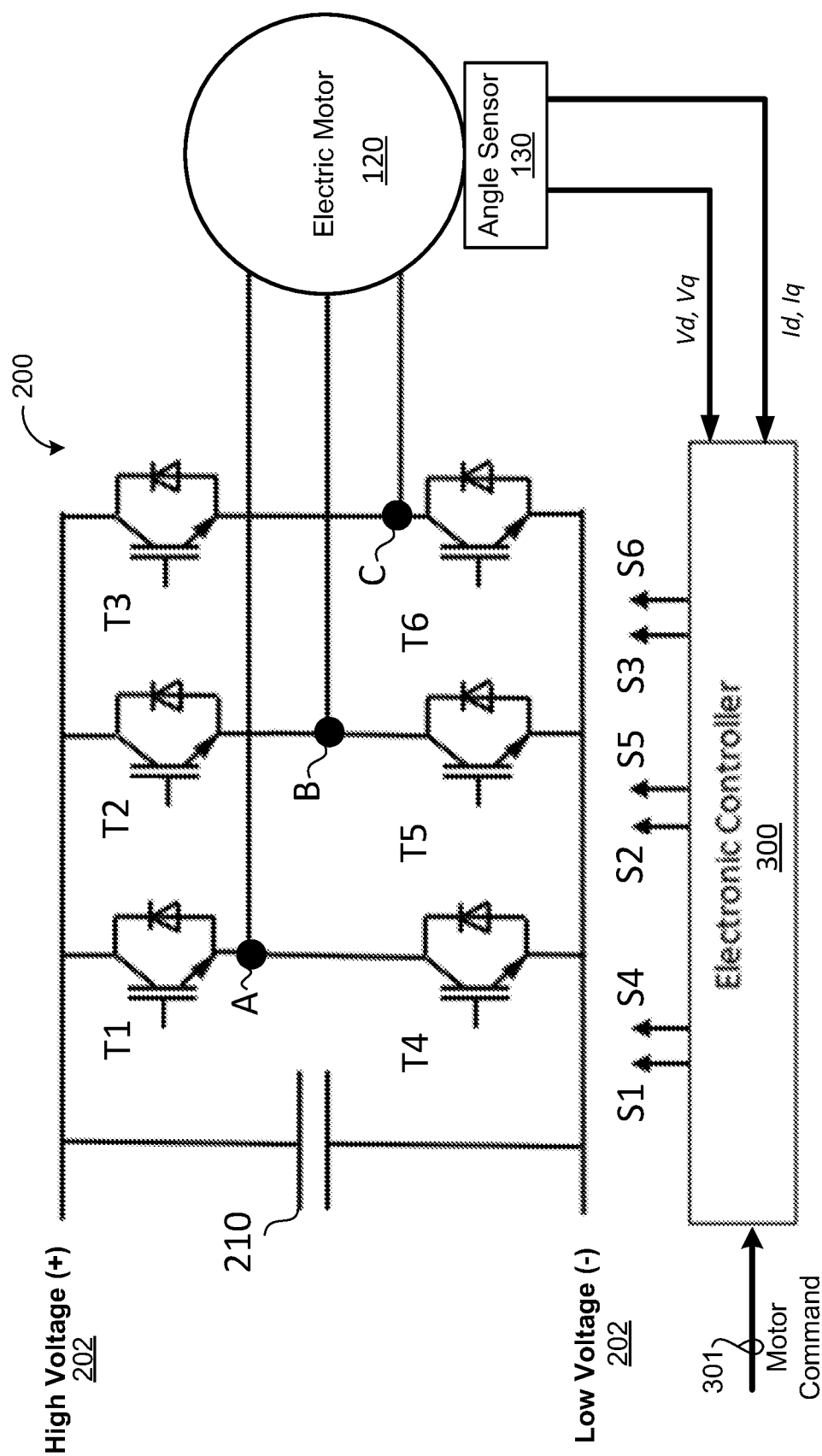
FIG. 2 is a schematic view of a circuit diagram for the three-phase inverter of the electric drive system of FIG. 1.

FIG. 2 is a circuit diagram of the 3-phase inverter 200 connected to the electric motor 120. The inverter 200 is electrically connected to a low voltage (−) node 202 (e.g., negative terminal of the battery 110 (FIG. 1)) and to a high voltage (+) node 204 (e.g., positive terminal of the battery 110 (FIG. 1)). The low voltage (−) node 202 shown in FIG. 2 represents a ground reference. The ground reference is not necessarily electrically connected to Earth. Instead, the ground reference represents a node that is maintained at a reference voltage that is substantially constant with respect to other voltages, which can be zero (0) volts or any non-zero voltage. The inverter 200 may also include a DC capacitor 210 connected in parallel to the high voltage (+) node 204 and the low voltage (−) node 202. The DC capacitor 210 is configured to generate an input voltage charged by the battery 110 (FIG. 1). The input voltage of the DC capacitor 210 may be the input voltage of the inverter 200 that controls a plurality of switches T and drives the electric motor 120.

The inverter 200 includes a plurality of switches T (e.g., six (6) switches T1-T6). The plurality of switches may be a series of connected pairs of switches such as a first and fourth switch T1, T4, a second and fifth switch T2, T5, and a third and sixth switch T3, T6. To avoid short circuiting, both switches T in each pair of switches T cannot both be closed at the same time. As used herein, whether a respective switch is closed or open is referred to as a corresponding switch state for the respective switch. Each switch T can be any power semiconductor switch, for example, a metal-oxide-semiconductor field-effect transistor (MOSFET) or an insulated-gate bipolar transistor (IGBT). Moreover, each switch also includes a diode connected in parallel to provide reverse current flow.

The inverter 200 further includes a respective output node A-C for each corresponding pair of switches T. Here, each output node may interchangeably be referred to as an output leg of the inverter 200. As shown in FIG. 2, a first output node A corresponds to the pair of switches including the first and fourth switches T1, T4, a second output node B corresponds to the pair of switches including the second and fifth switches T2, T5, and a third output node C corresponds to the pair of switches including the third and sixth switches T3, T6. Each respective output node may be connected to either the high voltage (+) node 204 or the low voltage node (−) 202. For instance, when the first switch T1 is closed and the fourth switch T4 is open, the first output node A is connected (i.e., clamped) to the high voltage (+) node 204.

Alternatively, when the first switch T1 is open and the fourth switch T4 is closed, the first output node A is connected (i.e., clamped) to the low voltage (−) node 202. As such, the output nodes A-C provide AC power signals to drive the electric motor 120, or provide the DC voltage directly from the battery 110, when the inverter 200 clamps the corresponding output node. During PWM control, each output node A-C includes AC power (e.g., sinusoidal signal) separated by one-hundred and twenty degrees phase angle from each other output node A-C.

The inverter 200 also includes a controller 300 configured to control the switch state of each switch of the plurality of switches T. More specifically, the controller 300 is electrically connected to each respective switch T and is configured to control the respective switch T with a corresponding control signal S. As shown in FIG. 2, a first control signal S1 is configured to control the switch state of the first switch T1, a second control signal S2 is configured to control the switch state of the second switch T2, a third control signal S3 is configured to control the switch state of the third switch T3, a fourth control signal S4 is configured to control the switch state of the fourth switch T4, a fifth control signal S5 is configured to control the switch state of the fifth switch T5, and a sixth control signal S6 is configured to control the switch state of the sixth switch T6. Thus, by outputting the controls signals S the controller 300 can control the switch state (e.g., closed or open) of each switch S and provide AC power to control the electric motor 120 via the output nodes A-C.

In some examples, the controller 300 receives a motor command signal 301 representing the desired operating state of the electric motor 120 for providing power to the electric vehicle 100 (FIG. 1). The controller 300 may use PWM to calculate the duty cycles (e.g., closed and open times) for the switches T. As will become apparent, in some implementations, the controller 300 uses discontinuous pulse width modulation (DPWM) to calculate the duty cycle for the switches T. In these implementations, DPWM improves the efficiency of the inverter 200 by reducing switching losses of the switches T by clamping two of the switches T of a respective phase at a time.

In some examples, the controller 300 receives torque related information of the electric motor 120 during operation thereof. That is, the controller 300 may receive voltage vector command values Vd, Vq. In some examples, the controller 300 determines the voltage vector command values Vd, Vq based on the motor command 301. Here, the voltage vector command values Vd, Vq represent output voltages applied to the electric motor 120 to achieve the motor command 301. In other examples, the controller 300 receives the voltage vector command values Vd, Vq from an angle sensor 130 of the electric motor 120 representing rotor angle measurements of the electric motor 120. Moreover, the controller 300 may optionally receive current measurements Id, Iq from the electric motor 120. Described in more detail with reference to FIGS. 3A and 3B, the controller 300 may generate the control signals S1-S6 based, in part, on voltage vector command values Vd, Vq and/or the current measurements Id (e.g., d-axis current), Iq (e.g., q-axis current) received from the electric motor 120. As described above the controller 300 may clamp two (2) of the switches T for one-third of the period of the control signal S to reduce the switching losses. However, determining when to clamp the two (2) switches T in an adaptive and/or predictive manner will further reduce the switching losses.

Figure 3A:
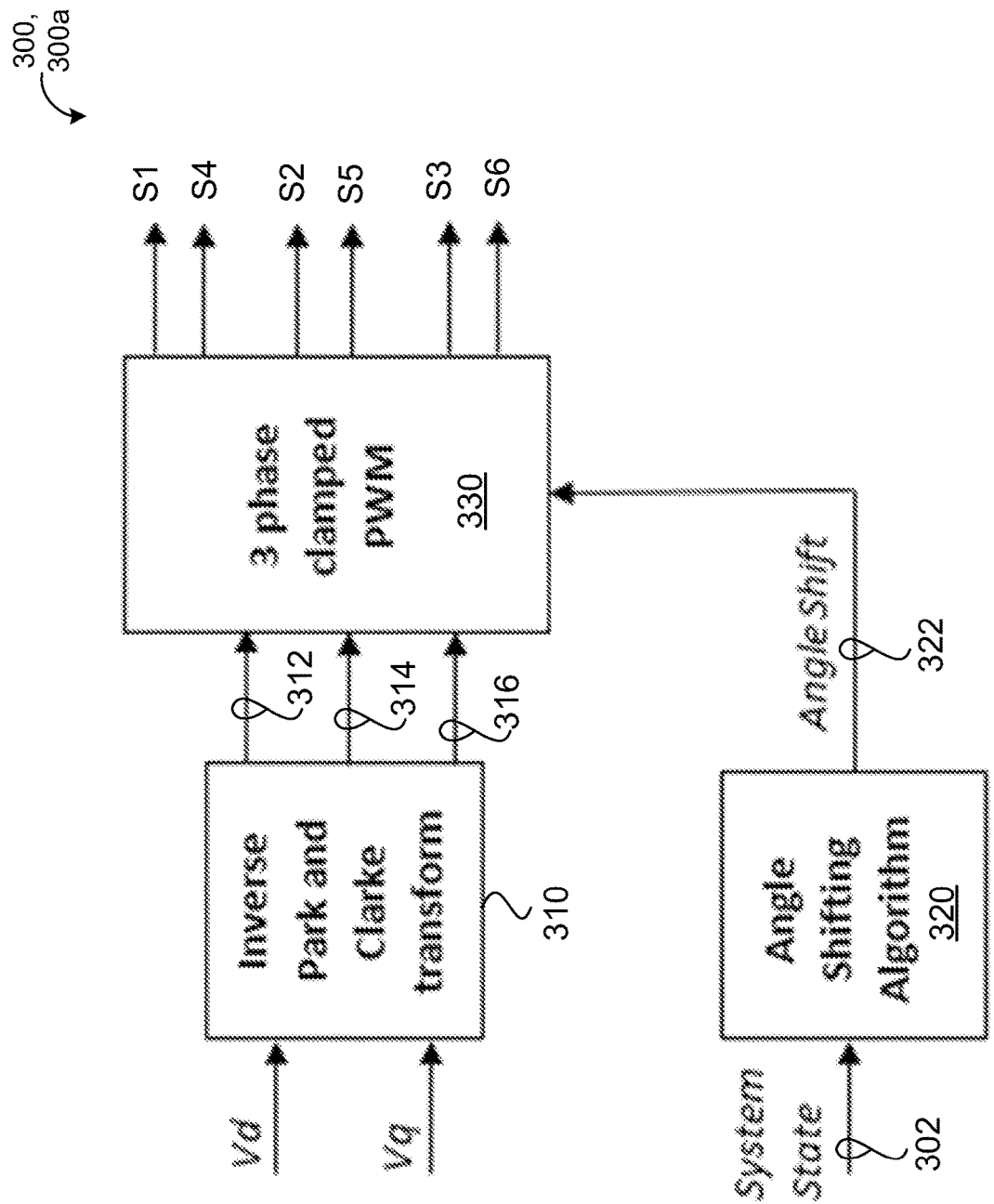
FIGS. 3A and 3B are schematic views of an example controller determining control signals for the three-phase inverter of FIG. 2 based on an angle shift.
Figure 3B:
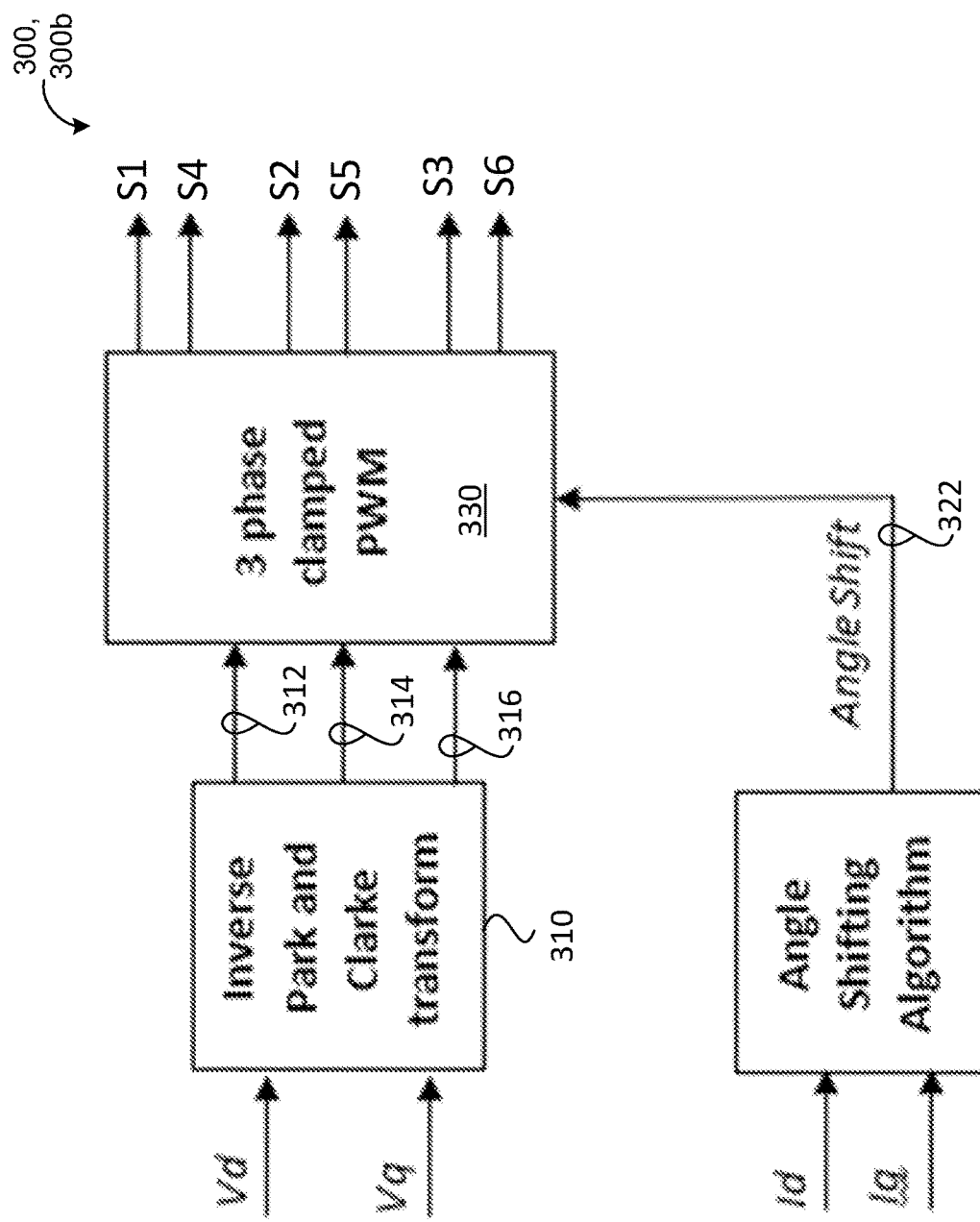

Referring now to FIGS. 3A and 3B, the controller 300 includes a transformation module, an angle shift module 320, and a PWM module 330. In some examples, the controller is configured to perform PWM whereby the controller 300 determines duty cycles (e.g., closed and open times) for each of the switches T of the inverter to adjust a torque of the electric motor to a desired value (e.g., motor command signal). In some implementations, the controller 300 performs DPWM whereby the controller 300 determines the duty cycles for each of the switches T. In these implementations, DPWM improves the efficiency of the inverter 200 (as compared to PWM) by reducing switching losses for the switches T of the inverter 200. Accordingly, the controller 300 may be configured to determine torque related information of the electric motor 120 during operation thereof based on a signal provided from the rotational angle sensor 130 and current values provided to the electric motor 120. To this end, the controller 300 is configured to operate the switches T1-T6 via the control signals S1-S6 so that the electric motor 120 operates according to the motor command signal 301 while simultaneously minimizing switching losses.

The transformation module 310 is configured to receive, at each time step, the voltage vector command values Vd, Vq at a corresponding time step, and generate a corresponding three-phase output 312, 314, 316. In some examples, the transformation module 310 applies an inverse Park transformation on the voltage vector command values Vd, Vq to generate the corresponding three-phase output 312, 314, 316. Additionally or alternatively, the transformation module 310 may apply an inverse Clarke transformation on the voltage vector command values Vd, Vq to generate the corresponding three-phase output 312, 314, 316. The PWM module (e.g., three-phase claimed PWM module 220) is configured to receive the three-phase output 312, 314, 316 generated by the transformation module 310 at the corresponding time step based on the voltage vector command values Vd, Vq and generate, as output, the control signals S1-S6 based on the three-phase output 312, 314, 316 and an angle shift 322.

Referring now specifically to FIG. 3A, in some implementations, the angle shift module 320 of an example controller 300, 300a determines the angle shift 322 based on system state information 302 of the electric vehicle (FIG. 1). Here, the system state information 302 of the electric vehicle may include, without limitation, a torque request (e.g., acceleration request), brake request (e.g., deceleration request), mass of the electric vehicle, steering angle request (e.g., turning request), and/or a global positioning system (GPS) signal of the electric vehicle. For instance, an operator of the electric vehicle 100 may request torque by pressing an accelerator pedal, request braking by pressing the brake pedal, or request a steering angle by turning a steering wheel. Alternatively, an adaptive cruise control controller or an autonomous vehicle controller of the electric vehicle may generate these requests without any interaction by the operator. The mass of the electric vehicle 100 may be known prior based on a fixed value set by the manufacturer of the electric vehicle 100 and/or may be determined by load sensors of the electric vehicle 100. Moreover, the GPS signal may indicate a geographical location of the vehicle that may be cross-referenced with mapping information to predict operating characteristics of the vehicle such as, for example, that the electric vehicle is approaching a turn, approaching an ascending grade of the road (e.g., uphill road), and/or approaching a descending grade of the road (e.g., downhill road). Cross-referencing the geographical location of the vehicle with mapping information may further allow predictions of upcoming torque or brake requests such as when the vehicle is approaching entry onto a highway (e.g., upcoming torque request to increase vehicle speed for highway speed limit) or which the vehicle is about to approach a stop sign, an intersection, and/or enter a zone with a reduced speed limit (e.g., upcoming brake request to reduce speed of the vehicle). Additionally, real-time or predicted traffic information may be further cross-referenced to ascertain information such as that the vehicle is approaching a congested area and will likely be reducing speed. Thus, the angle shift module 320 uses the system state information to opportunistically adapt/predict operating conditions of the electric motor 120 and thereby output the angle shift 322 to allows the PWM module 330 to opportunistically control when to apply clamping on respective pairs of switches T. For example, based on the current speed and a GPS signal ascertained from system state information 302 indicating the vehicle 100 is approaching an ascending grade on the roadway, the angle shift module 320 may calculate a value for the angle shift 322 based on a determination that the electric vehicle 100 will require additional torque in order to maintain a current rate of speed while traveling on the ascending grade on the roadway. In response to receiving the angle shift 322, the PWM module 330 determines the corresponding control signals S1-S6 for opportunistically applying clamping during DPWM in order to minimize the switching losses.

Accordingly, the PWM module 330 is configured to receive, as input, the three-phase output 312, 314, 316 and the angle shift 322, and determine, as output, corresponding control signals S1-S6 that optimally apply clamping on respective pairs of switches T1/T4, T2/T5, T3/T6 in a manner that reduces switching losses compared to the conventional technique of applying DPWM that only relies on the voltage vector command values Vd, Vq. Advantageously, the PWM module 330 determine the control signals S1-S6 based, in part, on the angle shift 322 whereby the PWM module opportunistically (e.g., predictively) determines the control signals S1-S6 that will minimize the switching losses of the inverter 200 (FIG. 2). Simply put, without using the angle shift 322 to determine the control signals S1-S6, the PWM module 330 determines the control signals S1-S6 based only on the on the voltage vector command values Vd, Vq such that the PWM module 330 is unable to opportunistically or adaptively determine the control signals S1-S6 for clamping such that switching losses are not effectively minimized. Thus, the angle shift 322 determination based on the system state information 302 and received by the PWM module 330 indicates when to perform clamping on respective phases A-C of the inverter 200.

Referring now to FIG. 3B, in some implementations, the angle shift module 320 of an example controller 300, 300b determines the angle shift 322 based on the current measurements Id, Iq received from the electric motor 120a in addition to, or in lieu of, the system state information 302 used by the controller 300a of FIG. 3A. That is, based on scenarios when the current measurements Id, Iq lag the voltage vector command values Vd, Vq, determining the controls signals S1-S6 (e.g., determining which switches to clamp) for applying DPWM based solely on the voltage vector command values Vd, Vq of the rotor angle will not be optimal due to the lag of the current measurements Id, Iq. Stated differently, the current phase of the electric motor 120 indicated by the current measurements Id, Iq may be offset (e.g., lag) relative to the voltage phase applied to the electric motor 120. Accordingly, the angle shift module 320 of the controller 300b uses the current measurements Id, Iq to determine the angle shift 322 that accounts for the lag from the voltage measurements in order to cause the PWM module 330 to clamp the corresponding switches T of a respective phase of the inverter 200 once the current measurements Id, Iq match the voltage measurements of the voltage vector command values Vd, Vq. The system state information 302 of FIG. 3A may include the current measurements Id, Iq.

Figure 4:
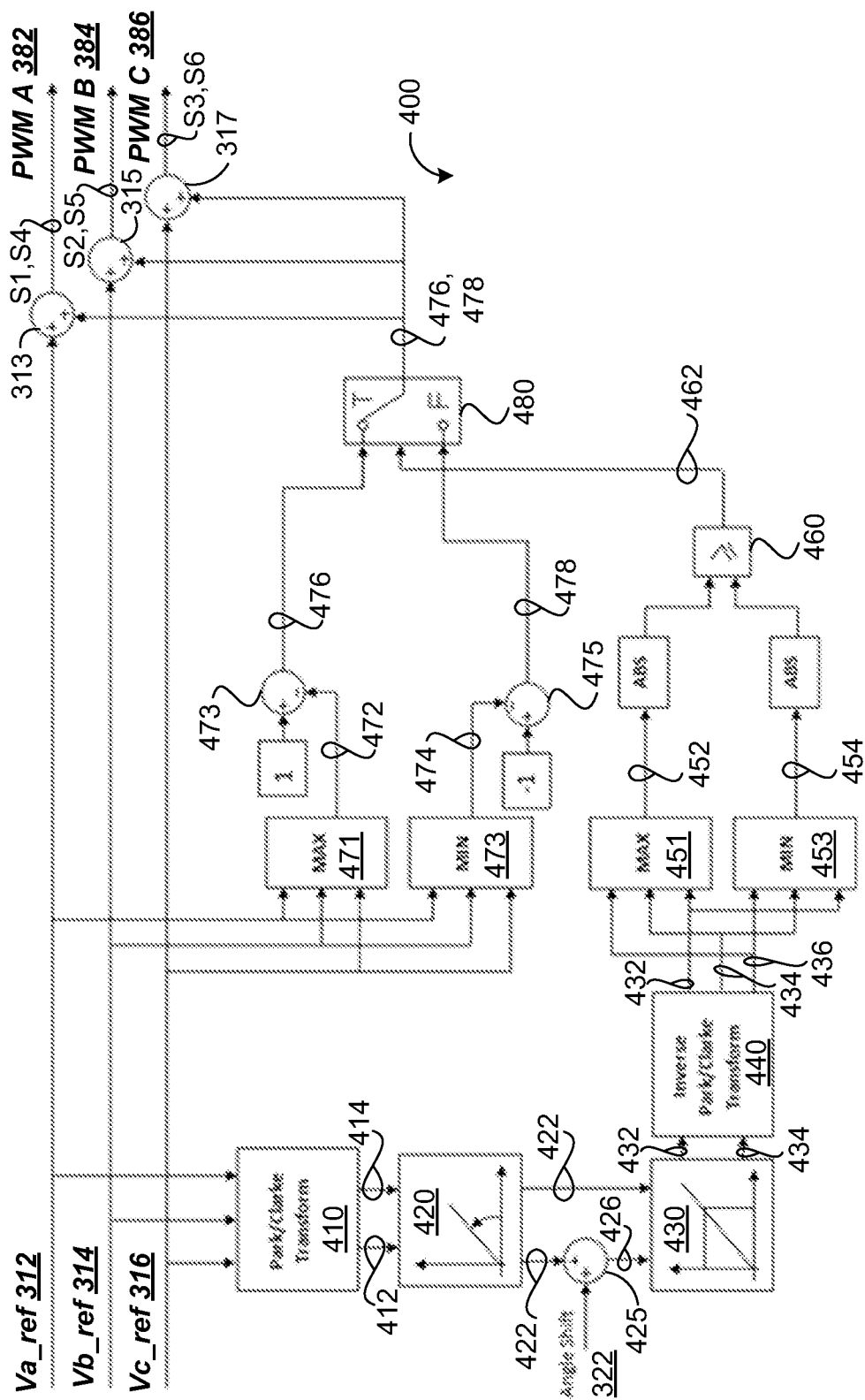
FIG. 4 is a schematic view of a clamped space vector modulator based on the angle shift.

FIG. 4 shows a schematic view of an example clamped space vector modulator 400 using the angle shift 322 generated by the angle shift module 320 (FIGS. 3A and 3B) for controlling switch states of the plurality of switches T1-T6 while the inverter is performing DPWM. For instance, the clamped space vector modulator 400 may correspond to the PWM module 330 of the controllers 300 of FIGS. 3A and 3B. A first phase transform module 410 receives voltage reference signals Va 312, Vb 314, Vc 316 and generates a two-phase output 412, 414. In the example shown, the reference signals Va, Vb, Vc correspond to respective ones of the three-phase output 312, 314, 316, respectively. A first coordinate transform module 420 is configured to receive the two-phase output 412, 414 generated by the first phase transform module 410 and generate a corresponding polar coordinate output 422. Here, the first coordinate transform module 420 generates the polar coordinate output 422 by transforming the two-phase output 412, 414 from Cartesian to polar coordinates. Thereafter, an adder 425 adds the angle shift 322 generated by the angle shift module 320 (FIGS. 3A and 3B) to the polar coordinates 422 to generate angle shifted polar coordinates 426. A second coordinate transform module 430 may then receive the polar coordinates 422 output by the first coordinate transform module 420 and the angle shifted polar coordinates 426 corresponding to the polar coordinates 422 added to the angle shift 322 by the adder 425 and generates a corresponding Cartesian coordinate output 432, 434. Here, the second coordinate transform module 430 generates the Cartesian coordinate output 432, 434 by transforming the input polar coordinates 422, 426 to Cartesian coordinates.

A second phase transform module 440 receives the Cartesian coordinate output 432, 434 and generates a corresponding angle shifted three-phase output 432, 434, 436. Thus, the corresponding angle shifted three-phase output 432, 434, 436 generated by the second phase transform module 440 may correspond to the reference voltages Va 312, Vb 314, Vc 316 conditioned on the angle shift 322 generated by the angle shift module 320 (FIGS. 3A and 3B). A maximum operator 451 receives the angle shifted three-phase output 432, 434, 436 generated by the second phase transform module 440 and outputs a corresponding maximum value 452. Likewise, a minimum operator 453 receives the angle shifted three-phase output 432, 434, 436 generated by the second phase transform module 440 and outputs a corresponding minimum value 454. Absolute values of the maximum and minimum values 452, 454 are compared by a first conditional switch 460. The first conditional switch 460 is configured to output a value 462 equal to "true" when the absolute maximum value 452 and the absolute minimum value 454 are greater than or equal to one. Conversely, the first conditional switch 460 is configured to output the value 462 equal to "false" when the absolute maximum value 452 and the absolute minimum value 454 are less than one.

Another set of maximum and minimum operators 471, 473 are each configured to receive the reference voltages Va 312, Vb 314, Vc 316 (e.g., without adding the angle shift 322) and output corresponding maximum and minimum values 472, 474. In some examples, a subtractor 473 subtracts the maximum value 472 from one (1) to generate a first output value 476 and another subtractor 475 subtracts the minimum value 474 from negative one (−1) to generate a second output value 478. A second conditional switch 480 is configured to receive the value 462 from the first conditional switch 462 and output either the first output value 476 when the value 462 is equal to "true" or the second output value 478 when the value 462 is equal to "false". A corresponding adder 313, 315, 317 associated with each reference signal Va 312, Vb 314, Vc 316 then adds the first output value 476 or the second output value 478 passing through the second conditional switch 480 to the corresponding reference signal Va 312, Vb 314, Vc 316 to generate a corresponding control signal PWM A 382, PWM B 384, PWM C 386. Each control signal PWM A-C corresponds to a pair of control signals S shown in FIGS. 3A and 3B. For instance, control signal PWM A 382 corresponds to the first and fourth control signal S1, S4 such that the control signal PWM A 382 controls the first switch T1 and the fourth switch T4, and thus, controls the voltage at the output node A. Control signal PWM B 384 corresponds to the second and fifth control signals S2, S5 such that the control signal PWM B 384 controls the second switch T2 and the fifth switch T5, and thus, controls the voltage at the output node B. Control signal PWM C 386 corresponds to the third and sixth control signals S3, S6 such that the control signal PWM C 386 controls the third switch T3 and the sixth switch T5, and thus, controls the voltage at the output node C. Notably, each of the control signals PWM A-C include a respective clamping phase where the respective pair of switches T undergo clamping for one-third a period of the corresponding control signal PWM. Since the AC power signals provided by each of the output nodes A-C of the inverter are separated by one-hundred and twenty degrees (120-degrees) phase angle, the electronic controller 300 outputs control signals PWM A-C such that only one pair of switches T are controlled to undergo clamping for 60-degrees (i.e., one-third the period of time) phase angle while each of the other two pairs of switches T are controlled using PWM.

Figure 5:
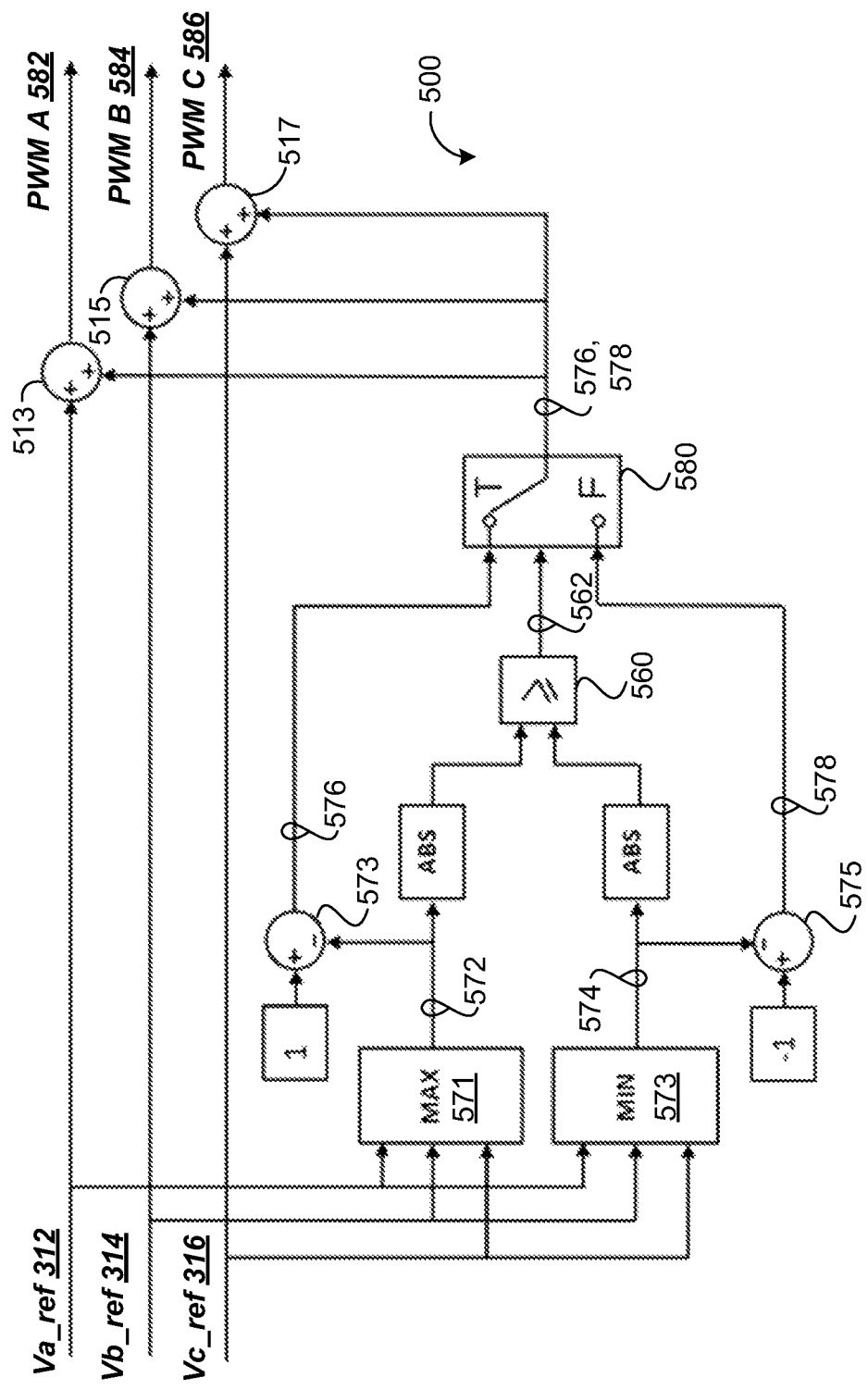
FIG. 5 is a schematic view of a clamped space vector modulator without using angle shift.

By contrast to the clamped space vector modulator 400 of FIG. 4 that uses the angle shift 322 for controlling the switch states, FIG. 5 shows a schematic view of another clamped space vector modulator 500 that does not use angle shift 322 for controlling switch states of the plurality of switches T1-T6. Similar to the clamped space vector modulator 400, a set of maximum and minimum operators 571, 573 are each configured to receive the reference voltages Va 312, Vb 314, Vc 316 (e.g., not conditioned on any angle shift 322) and output corresponding maximum and minimum values 572, 574. In some examples, a subtractor 573 subtracts the maximum value 572 from one (1) to generate a first output value 576 and another subtractor 575 subtracts the minimum value 574 from negative one (−1) to generate a second output value 578.

The clamped space vector modulator 500 compares absolute values of the maximum and minimum values 572, 574 at a first conditional switch 560. The first conditional switch 560 is configured to output a value 562 equal to "true" when the absolute maximum value 572 and the absolute minimum value 574 are greater than or equal to one. Conversely, the first conditional switch 560 is configured to output the value 562 equal to "false" when the absolute maximum value 572 and the absolute minimum value 574 are less than one. A second conditional switch 580 is configured to receive the value 562 from the first conditional switch 560 and output either the first output value 576 when the value 562 is equal to "true" or the second output value 578 when the value is equal to "false". Thus, by contrast to the clamped space vector modulator 400 of FIG. 4 where the second conditional switch 480 is controlled based on the absolute maximum and minimum values 572, 574 conditioned on the angle shift 322, the second condition switch 580 of the clamped space vector modulator 500 is controlled based on the absolute maximum and minimum values 572, 574 not conditioned on any angle shift 322 determination. A corresponding adder 513, 515, 517 associated with each reference signal Va 312, Vb 314, Vc 316 then adds the first output value 576 or the second output value 578 passing through the second conditional switch 480 to the corresponding reference signal Va 312, Vb 314, Vc 316 to generate a corresponding control signal PWM A 582, PWM B 584, PWM C 586.

Notably, the clamped space vector modulator 500 of FIG. 5 that does not incorporate angle shift 322, calculates clamping periods for DPWM arbitrarily based solely on the voltage vector command values Vd, Vq of the rotor angle of the electric motor 120, and by contrast to the clamped space vector modulator 400 of FIG. 4 that incorporates angle shift 322 based on the system state information 302 (FIG. 3A) and/or the current measurements id, iq (FIG. 3B) of the electric motor, inherently has no ability to minimize switching losses imposed on the inverter 200 while performing DPWM. That is, the use of the angle shift 322 employed by the clamped space vector modulator 400 of FIG. 4 provides the controller 300 with the ability to control the three-phase inverter 200 to opportunistically perform DPWM by calculating optimal times for clamping each phase of the inverter to minimize switching losses.

Figure 6:
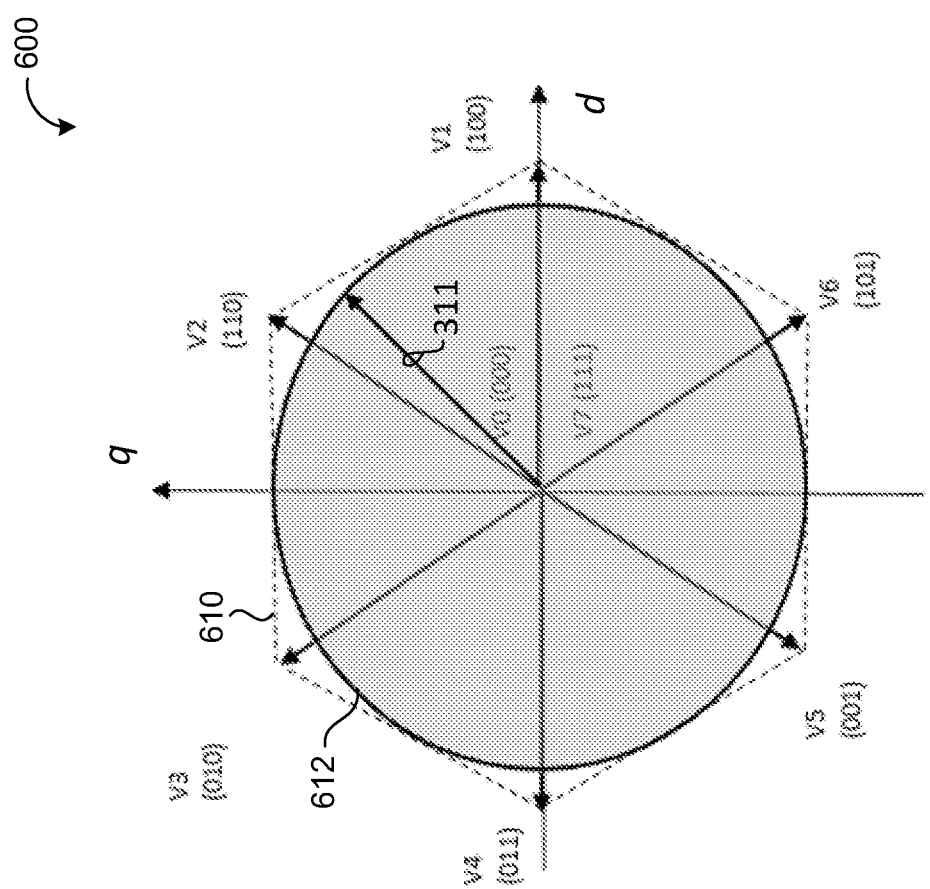
FIG. 6 is a state space voltage switching vector diagram showing the linear modulation region.
Figure 7:
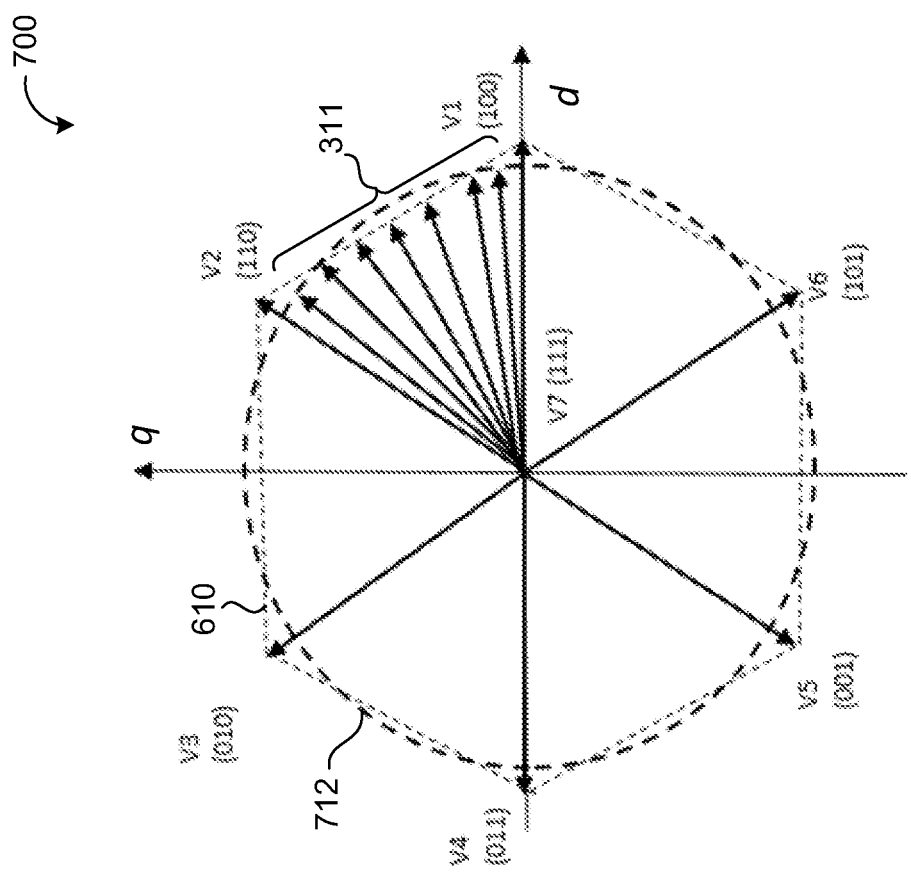
FIG. 7 is a state space voltage switching vector diagram showing the overmodulation region.

FIGS. 6 and 7 illustrate state space voltage switching vector diagrams (e.g., vector diagram) depicting six (6) of eight (8) switching states V (e.g., switching vectors) of the plurality of switches T1-T6. The vector diagrams illustrate d-axis voltage vector command values Vd along the x-axis and q-axis voltage vector command values Vq along the y-axis. Each switching state V0-V7 includes a respective magnitude and a respective angle (e.g., direction) and represents a voltage applied to the electric motor 120 by the controller 300. As described above, the switching states V are controlled using signals S1-S6 to control the plurality of switches T. Here, when one switch T from a respective pair of switches is closed, the other switch from the respective pair of switches must be open to prevent short circuiting. As such, the plurality of switches T include eight (8) possible switching states V including six (6) active switch states (e.g., V1-V6) and two (2) zero voltage switch states (e.g., V0 and V7). Each switching state V represents a state (e.g., open or closed) for each of the plurality of switches T of the inverter 200. Stated differently, each of the eight (8) switching states V represents a different combination of possible switching states of the switches T of the inverter 200.

Accordingly, each switching state V is represented by a three-bit binary number. Each bit of the three-bit binary number represents a switching state for a respective one of the output nodes of the inverter 200. For example, a most significant bit (left most bit) represents a switching state V for the first and fourth switches T1, T4. When the most significant bit is '1,' the first switch T1 is closed and the fourth switch T4 is open. Conversely, when the most significant bit is '0,' the first switch T1 is open and the fourth switch T4 is closed. Moreover, a second most significant bit (middle bit) represents a switching state V for the second and fifth switch T2, T5 and a least significant bit (right most bit) represents a switching state V for the third and sixth switches T3, T6. Zero voltage switch states V0, V7 represent a switching state V where switches T1-T3 are all open and T4-T6 are all closed (e.g., V0), or a switching state V where switches T1-T3 are all closed and T4-T6 are all open (e.g., V7) whereby the inverter 200 applies zero voltage to the electric motor 120.

In some implementations, the controller 300 generates the three-phase output 312, 314, 316 (e.g., also referred to as simply "reference vector 311") by instructing the plurality of switches T to alternative between adjacent switching states. For example, the reference vector 311 shown in FIG. 6 represents a requested output voltage and phase angle to be applied to the electric motor 120. In this example, to output the requested output voltage and phase angle to the electric motor 120, the controller 300 generates the plurality of control signals S1-S6 to alternate between the first switching state V1 and the second switching state V2. Moreover, the controller 300 may generate the plurality of control signals S1-S6 to further alternate between the zero voltage vectors V0, V7 thereby limiting a magnitude (e.g., output voltage) applied at the electric motor 120.

With continued reference to FIG. 6, a first vector diagram 600 shows the six (6) active switching states V1-V6 joined via lines forming a hexagon region 610 defining a linear modulation region 612 depicted by a shaded circle. When the inverter 200 operates the electric motor 120 in the linear modulation region (e.g., non-over modulation operation) the magnitude (e.g., output voltage) of the reference vector 311 is constrained by the linear modulation region 612. That is, the linear modulation region 612 represents a maximum output voltage applied at the electric motor 120 by the inverter 200 in the linear modulation region 612. Stated differently, because the magnitude of the reference vector 311 is constrained by the linear modulation region 612, the output voltage applied to the electric motor 120 is similarly constrained by the linear modulation region 612. Performance of the reference vector 311 may be represented by a modulation index defining a normalized reference voltage. As used herein, the modulation index represents a ratio of the maximum magnitude of the reference vector 311 to the maximum available voltage (e.g., battery voltage) represented by:

$$M = \frac{V_r}{V_{dc}} * \frac{\pi}{2} \qquad (1)$$

In Equation1, $V_{dc}$ represents a voltage at the DC capacitor 210 (e.g., battery voltage) and $V_r$ represents the peak fundamental phase voltage represented by:

$$V_r = \sqrt{V_d^2 + V_q^2} \qquad (2)$$

In Equation 2, $V_d$, $V_q$ are the commanded voltage vector values. For example, the modulation index of the reference vector 311 when the inverter 200 operates the electric motor 120 in the linear modulation region 612 may range from 0 to 0.906. Thus, at best, the reference vector 311 may only request an output voltage having a magnitude of 90.6% of the total voltage at the DC capacitor (e.g., battery voltage). Notably, the linear modulation region 612 constrains the output voltage applied at the electric motor 120 to prevent thermal overloading and motor oscillations.

Referring now to FIG. 7, a first vector diagram 700 shows the six (6) active switching states V1-V6 joined via lines forming the hexagon region 610 and further defining an overmodulation region 712 depicted by a dashed circle. When the inverter 200 operates the electric motor 120 in the overmodulation region 712 (e.g., overmodulation operation) the magnitude of the reference vector 311 is no longer constrained by the linear modulation region 612 (FIG. 6), but instead is only constrained by the overmodulation region 712. Notably, the overmodulation region 712 is greater than the linear modulation region 612 (FIG. 6). As such, operating the electric motor 120 in the overmodulation region 712 allows a greater maximum output voltage to be applied at the electric motor as compared to the linear modulation region.

The controller 300 operates the electric motor 120 in the overmodulation region by applying a second sine wave with a frequency three (3) times the fundamental frequency also referred to as third harmonic injection. Thus, in some implementations, the modulation index during operation in the overmodulation region range from 0 to 1 or even from 0 to 1.154. That is, the maximum output voltage applied at the electric motor 120 may use 100% or even 115.4% of the input voltage of the battery. Advantageously, operating in the overmodulation region 712 thereby allows the inverter to apply a lager output voltage to the electric motor 120 causing a higher torque output by the electric motor 120. FIG. 7 further illustrates multiple reference vectors 311 each at a corresponding angle showing the progression of the reference vectors 311 as the electric motor 120 operates from the first switching state V1 to the second switching state V2.

Figure 8:
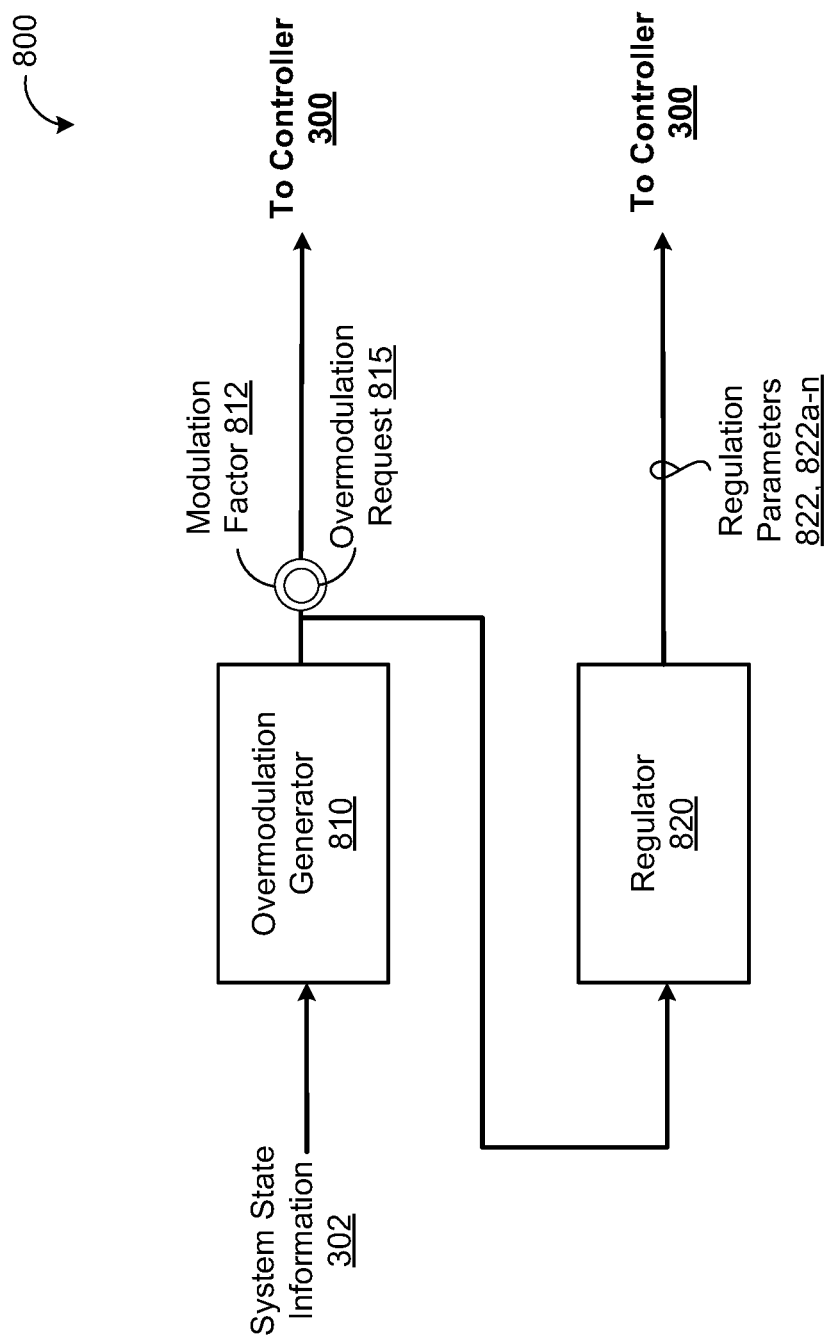
FIG. 8 is a schematic view of an overmodulation module.

Referring now to FIG. 8, in some implementations, the vehicle 100 employs the overmodulation module 800 to operate the electric motor 120 in the overmodulation region. Operating the electric motor 120 in the overmodulation region allows the inverter 200 to apply greater output voltages to the electric motor 120 resulting in higher torque output by the electric motor 120 by increasing the utilization of the input voltage by the battery 110 (FIG. 1). Notably, the higher torque output by the electric motor 120 provides several advantages to the electric vehicle 100 including, but not limited to, improved acceleration (e.g., zero (0) to sixty (60) time) and improved vehicle maneuvers such as steering maneuvers, and/or acceleration or deceleration maneuvers. Here, the improved vehicle maneuvers may provide faster maneuvers thereby allowing the electric vehicle 100 to avoid a collision whereby these improved vehicle maneuvers would otherwise be unavailable without the higher torque output by the electric motor 120. Consequently, operating the electric motor 120 in the overmodulation region has several consequences such as unwanted harmonics causing vibrations in the electric motor 120 and/or thermally overloading the electric motor 120. Accordingly, the overmodulation module 800 is configured request the electric motor 120 to operate in the overmodulation region only when the additional torque is necessary and control regulate operation of the electric motor 120 during overmodulation.

The overmodulation module 800 may include an overmodulation generator 810 and a regulator 820. The overmodulation generator 810 is configured to receive the system state information 302 of the electric vehicle 100 generate an overmodulation request 815 based on the system state information 302. Here, the system state information 302 of the electric vehicle may include, without limitation, the torque request (e.g., acceleration request), brake request (e.g., deceleration request), stability control request, drive mode request, steering angle request (e.g., turning request), a battery state, and/or the global positioning system (GPS) signal of the electric vehicle. For example, the overmodulation generator 810 may determine that a rate of change of the torque request satisfies an overmodulation threshold and, in response, generate the overmodulation request 815. Here, the overmodulation generator 810 determines that operating in the linear modulation region the electric motor 120 is unable to satisfy the rate acceleration requested by the torque request and that overmodulation is required to satisfy the rate of acceleration. In another example, the overmodulation generator 810 may determine that the stability control request satisfies the overmodulation threshold and, in response, generate the overmodulation request 815. Here, the stability control request may indicate that one or more wheels are slipping (e.g., accelerating faster than the other of the one or more wheels) due to, for example, slippery (e.g., icy) road conditions or off-road conditions. Thus, overmodulation generator 810 determines that the additional motor torque available during overmodulation is required to apply to the other of the one or more wheels to transition the electric vehicle back to stability.

In some implementations, the overmodulation generator 810 may determine the drive mode request satisfies the overmodulation threshold and, in response, generate the overmodulation request 815. That is, the operator requests the electric vehicle 100 to operate in, for example, a snow/ice mode, an off-road mode, or a sport mode whereby each drive mode request may require the electric motor 120 to operate with additional torque. Thus, the overmodulation generator 810 may generate the overmodulation request 815 to enable the electric motor 120 to produce the additional torque in the overmodulation region. In yet another example, the overmodulation generator 810 determines that the battery state satisfies the overmodulation threshold and, in response, generates the overmodulation request 815. For instance, the battery state may indicate that the battery 110 is in a power derating mode (e.g., battery limp mode) and require the electric motor 120 to provide additional torque to navigate the electric vehicle 100 to a safe stop.

In some implementations, the overmodulation generator 810 predicts that the electric vehicle 100 will require additional torque in the future based on the system state information 302. For example, the system state information 302 may indicate the electric vehicle is about to be in a collision. Thus, a vehicle safety control module and/or an autonomous control module may request a collision avoidance request (without input from the operator) to maneuver the vehicle to prevent the collision. For instance, the system state information 302 may include a collision avoidance request generated based on sensor data from one or more sensors (e.g., proximity sensors, radar, LiDAR, and or vision systems) implemented on the electric vehicle 100. For example, the sensor data may indicate that the electric vehicle 100 is about to crash with another vehicle or object. Thus, the overmodulation generator 810 determines that the collision avoidance request satisfies the overmodulation threshold by requesting the vehicle to perform an acceleration, deceleration, and/or steering maneuver to avoid the impending collision. Notably, the maneuvers required to avoid the collision may not be available with the limited torque output by the electric motor 120 operating in the linear modulation region, and thus, overmodulation is required to maneuver the vehicle to avoid the collision. In other examples, the overmodulation generator 810 cross-references the geographical information of the GPS signal and determines that the GPS signal satisfies the overmodulation threshold. For instance, the geographical information of the vehicle may be cross-referenced to ascertain information such as that the vehicle is approaching a congested area to determine overmodulation is required to avoid a collision. Accordingly, the overmodulation generator 810 generates the overmodulation request 815 based on determining that the system state information 302 satisfies the overmodulation threshold to avoid an impending collision.

Simply put, in each scenario that the overmodulation generator 810 determines that the overmodulation threshold is satisfied based on the system state information 302, the overmodulation generator 810 determines that the electric motor 120 requires additional torque only available only during operating in the overmodulation region. Thus, the overmodulation generator 810 outputs the overmodulation request 815 to the controller 300 thereby enabling the controller 300 to operate the electric motor 120 in the overmodulation region. The overmodulation generator 810 may continuously output the overmodulation request 815 to the controller 300 until the overmodulation generator 810 determines the system state information 302 no longer satisfies the overmodulation threshold. Once the system state information 302 no longer satisfies the overmodulation threshold, the overmodulation generator 810 instructs the controller 300 to return operation of the electric motor 120 to the linear modulation region.

Moreover, the overmodulation generator 810 determines a modulation factor 812 from a modulation index based on the system state information 302. The modulation factor 812 corresponds to a maximum output voltage applied at the electric motor 120. For instance, based on the system state information 302 the overmodulation generator 810 may determine that the electric motor 120 needs partial overmodulation and determines the modulation factor 812 to be 0.95. Here, the modulation factor 812 is output to the controller 300 enabling the controller 300 to generate a reference vector 311 having a maximum output voltage of 95% of the input battery voltage. In some examples, the overmodulation generator determines that the electric motor 120 requires full overmodulation and determines the modulation factor 812 to be 1 or 1.154. In these examples, the modulation factor 812 is output to the controller 300 enabling the controller to generate a reference vector 311 having maximum output voltage of 100% or 115.4% of the input battery voltage.

A consequence of operating the electric motor in the overmodulation region is oscillations of the electric motor 120 that may cause the electric vehicle 100 to vibrate and/or thermally overloading the electric motor 120 and controller 300. For instance, the reference vectors 311 shown in FIG. 7 have varying magnitudes (e.g., varying output voltages) as the reference vectors 311 progress from the first switching state V1 to the second switching state V2 causing the oscillations of the electric motor 120. Thus, the regulator 820 is configured to receive the overmodulation request 815 as input indicating that the electric motor 120 is operating in the overmodulation region and generate regulation parameters 822, 822*a-n* output to the controller 300. The regulation parameters 822 are configured to regulate the negative effects of operating the electric motor 120 in the overmodulation region. For instance, the regulator 820 may determine a time period that the electric motor 120 has been operating in the overmodulation region and determine whether the time period satisfies a threshold time period. Here, in response to determining that the time period satisfies the threshold time period, the regulator 820 generates a timeout regulation parameter 822, 822*a* instructing the controller 300 to cease operating the electric motor 120 in the overmodulation region and operate in the linear region. That is, the timeout regulation parameter 822a instructs the controller 300 to only operate the electric motor 120 in the overmodulation region for a limited time to protect the electric motor 120 from a thermal overload condition. Notably, the timeout regulation parameter 822a ceases operating the electric motor 120 in the overmodulation region regardless of whether the system state information 302 still satisfies the overmodulation threshold. After receiving the timeout regulation parameter 822a, the controller 300 may have to wait a predetermined amount of time before operating the electric motor 120 in the overmodulation region again.

Figure 9:
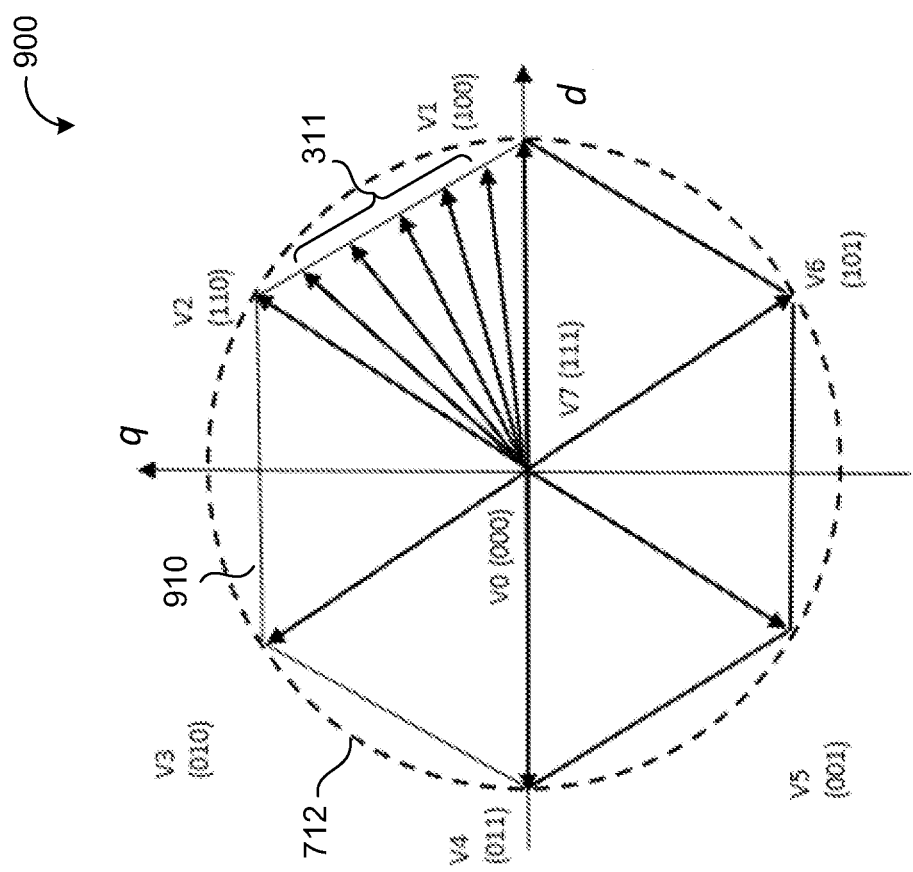
FIG. 9 is a state space voltage switching vector diagram showing the overmodulation region with smoothing.

In some implementations, the regulator 820 generates a voltage/current regulation parameter 822, 822b configured to smooth or set the magnitude of the reference vector 311 to a fixed-magnitude value. Setting the output voltage applied to the electric motor to a set voltage or current value eliminates the oscillations caused by varying magnitudes of reference vectors 311 as shown in FIG. 7. Referring now to FIG. 9, a third vector diagram 900 shows the six (6) active switching states V1-V6 joined via lines forming a fixed-magnitude hexagon region 910 and the overmodulation region 712 depicted by a dashed circle. Here, the fixed-magnitude hexagon region 910 constrains the magnitude of the reference vectors 311 to the fixed-magnitude value according to the voltage/current regulation parameters 822b. The fixed-magnitude value may be a predetermined value or may be determined by the regulator 820 to be a maximum magnitude whereby each reference vector 311 has a same magnitude. Notably, the fixed-magnitude hexagon region 910 is greater than the linear modulation region 612 (FIG. 6) but less than the overmodulation region 912. By constraining the reference vectors 311 to the fixed-magnitude hexagon region 910, the electric motor 120 still receives increased output voltage by operating in the overmodulation region 712 and eliminates the oscillations caused by varying magnitudes of the reference vectors 311. The regulator 820 may output the voltage/current regulation parameter 822b to the controller 300 such that the controller 300 generates the reference vector 311 using the fixed-magnitude value according to the voltage/current regulation parameter.

Figure 10:
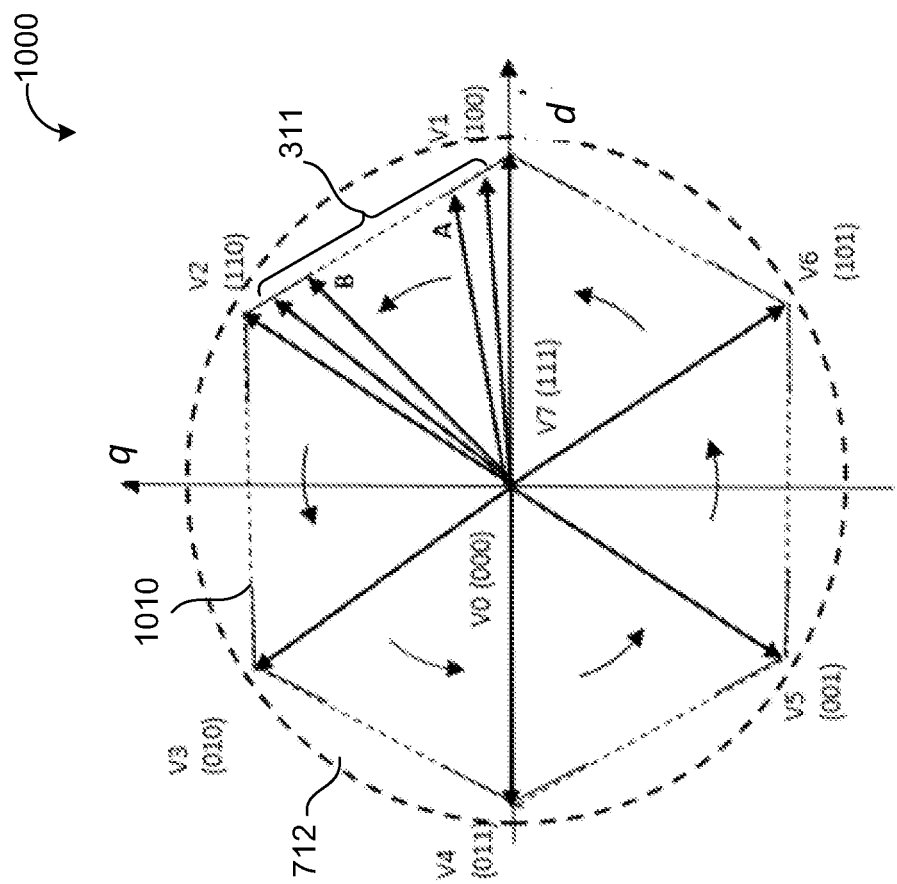
FIG. 10 is a state space voltage switching vector diagram showing the overmodulation region with interrupted rotation.

Referring back to FIG. 8, in some implementations, the regulator 820 generates an angle regulation parameter 822, 822c configured to apply reference vectors 311 with a same magnitude to the electric motor 120. In contrast to the voltage/current regulation parameter 822b, the angle regulation parameter 822c instructs the controller 300 to only apply reference vectors 311 at particular angles whereby the reference vectors 311 at the particular the angles each have a same magnitude. Moreover, the angle regulation parameter 822c instructs the controller 300 to bypass applying other reference vectors 311 at other angles whereby the other reference vectors 311 at the other angles each have a different magnitude than the applied reference vectors 311. Referring now to FIG. 10, a fourth vector diagram 1000 shows the six (6) active switching states V1-V6 joined via lines forming a hexagon region 1010 and the overmodulation region 712 depicted by a dashed circle. Here, the hexagon region 1010 depicts the magnitude of the reference vectors 311 applied at the particular angles according to the angle regulation parameter 826. Notably, the controller 300 bypasses applying reference vectors 311 between point 'A' and point 'B' shown in FIG. 10 because these reference vectors 311 have different magnitudes and would cause oscillations at the electric motor 120. As such, the reference vectors 311 operate in the overmodulation region with interrupted rotation.

Advantageously, the controller 300 may operate the electric motor 120 in the overmodulation region in addition to, or in lieu of, operating the electric motor using DPWM. Thus, using DPWM the controller 300 may reduce the switching frequency of the inverter 200 to reduce switching losses while also applying operating in the overmodulation region to maximize the output voltage applied at the electric motor 120 to generate additional torque when needed by the electric vehicle 100. For instance, in addition to operating the electric motor 120 in the overmodulation region the controller 300 may determine an angle shift 322 configured to clamp one or more switches T to reduce switching losses of the electric motor 120 operating in the overmodulation region.

Figure 11:
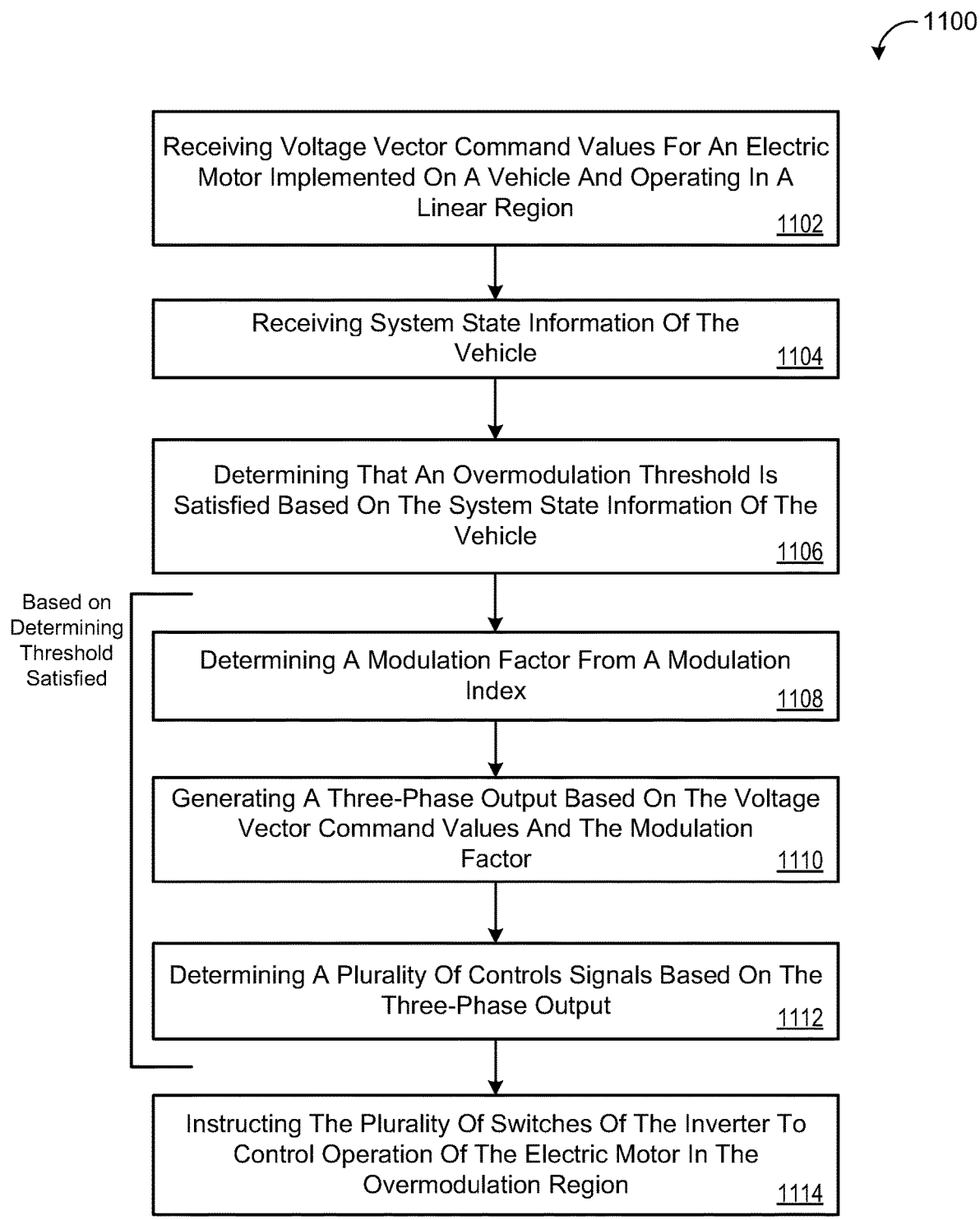
FIG. 11 is a flowchart of an example arrangement of operations for a computer-implemented method of performing adaptive PWM overmodulation.

FIG. 11 is a flowchart of an exemplary arrangement of operations for a computer-implemented method 1100 of performing adaptive PWM overmodulation. Data processing hardware 1310 (FIG. 13) may execute instructions stored on memory hardware 1320 (FIG. 13) that cause the data processing hardware 1310 to perform operations for the method 1100. The data processing hardware 510 and the memory hardware 1320 may reside on the controller 300. At operation 1102, the method 1100 includes receiving voltage vector command values Vd, Vq of an electric motor 120 implemented on a vehicle 100 operating in a linear region. At operation 1104, the method 1100 includes receiving system state information 302 of the vehicle. At operation 1106, the method 1100 includes determining that an overmodulation threshold is satisfied based on the system state information 302 of the vehicle 100.

Based on determining that the overmodulation threshold is satisfied, the method 1100 performs operations 1108-1112. At operation 1108, the method 1100 includes determining a modulation factor 816 from a modulation index. At operation 1110, the method 1100 includes generating a three-phase output 312, 314, 316 (e.g., reference vector 311) based on the voltage vector command values Vd, Vq and the modulation factor 816. Here, the three-phase output 312, 314, 316 corresponds to the electric motor 120 operating in an overmodulation region. At operation 1112, the method 1100 includes determining a plurality of control signals S1-S6 of based on the three-phase output 312, 314, 316. Each respective control signal S of the plurality of control signals S corresponding to a respective switch T among a plurality of switches T of an inverter 200. At operation 1114, the method 1100 includes instructing the plurality of switches T to control operation of the electric motor 120 in the overmodulation region based on the plurality of control signals S.

Figure 12:
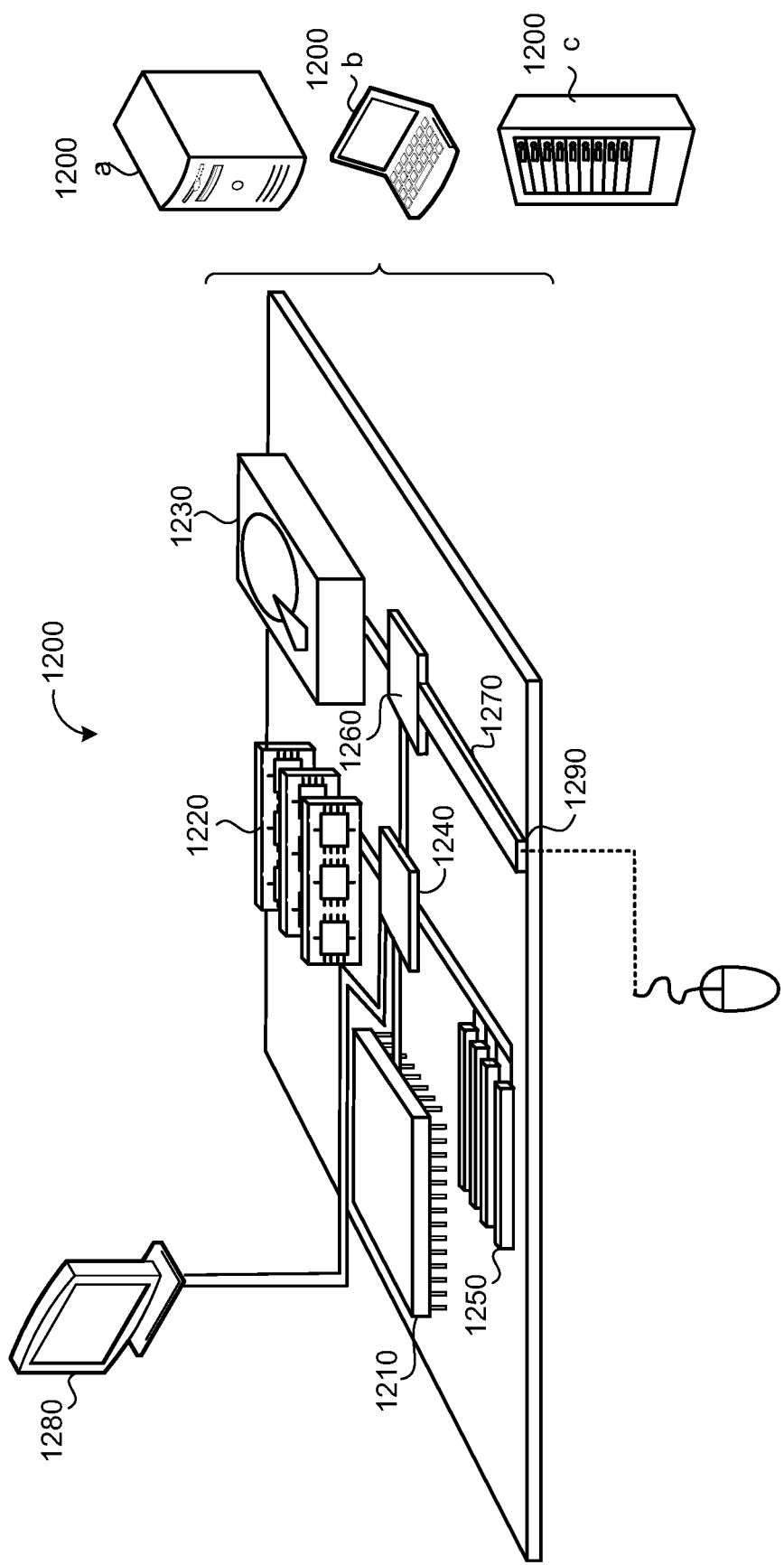
FIG. 12 is a schematic view of an example computing device that may be used to implement the systems and methods described herein.

FIG. 12 is schematic view of an example computing device 1200 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1200 includes a processor 1210, memory 1220, a storage device 1230, a high-speed interface/controller 1240 connecting to the memory 1220 and high-speed expansion ports 1250, and a low speed interface/controller 1260 connecting to a low speed bus 1270 and a storage device 1230. Each of the components 1210, 1220, 1230, 1240, 1250, and 1260, are interconnected using various busses, and may be mounted on a common motherboard or in other manners as appropriate. The processor 1210 can process instructions for execution within the computing device 1200, including instructions stored in the memory 1220 or on the storage device 1230 to display graphical information for a graphical user interface (GUI) on an external input/output device, such as display 1280 coupled to high speed interface 1240. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1230 is capable of providing mass storage for the computing device 1200. In some implementations, the storage device 1230 is a computer-readable medium. In various different implementations, the storage device 1230 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1220, the storage device 1230, or memory on processor 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and a low-speed expansion port 1290. The low-speed expansion port 1290, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1200a or multiple times in a group of such servers 1200a, as a laptop computer 1200b, or as part of a rack server system 1200c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving voltage vector command values for an electric motor, the electric motor implemented on a vehicle and operating in a linear modulation region;
   receiving system state information of the vehicle;
   determining that an overmodulation threshold is satisfied based on the system state information of the vehicle;
   based on determining that the overmodulation threshold is satisfied:
      determining a modulation factor from a modulation index;
      generating a three-phase output based on the voltage vector command values and the modulation factor, the three-phase output corresponding to the electric motor operating in an overmodulation region; and
      determining a plurality of control signals based on the three-phase output, each respective control signal of the plurality of control signals corresponding to a respective switch among a plurality of switches of an inverter; and
   instructing the plurality of switches of the inverter to control operation of the electric motor in the overmodulation region based on the plurality of control signals.

2. The computer-implemented method of claim 1, wherein the operations further comprise:
   determining a time period that the electric motor has been operating in the overmodulation region;
   determining that the time period satisfies a threshold time period; and
   based on determining that the time period satisfies the threshold time period, instructing the electric motor to cease operating in the overmodulation region and operate in the linear modulation region.

3. The computer-implemented method of claim 1, wherein generating the three-phase output comprises generating the three-phase output using a fixed-magnitude value.

4. The computer-implemented method of claim 1, wherein the system state of the vehicle comprises as least one of:
   a torque request;
   a brake request;
   a traction control request;
   a collision avoidance request;
   a battery limp request; or
   a global position system (GPS) signal of the vehicle.

5. The computer-implemented method of claim 1, wherein determining that the overmodulation threshold is satisfied based on the system state information of the vehicle comprises determining that a rate of change of a torque request satisfies the overmodulation threshold.

6. The computer-implemented method of claim 1, wherein determining that the overmodulation threshold is satisfied based on the system state information of the vehicle comprises determining a collision avoidance request satisfies the overmodulation threshold.

7. The computer-implemented method of claim 1, wherein the modulation factor corresponds to a maximum output voltage applied at the electric motor.

8. The computer-implemented method of claim 1, wherein the plurality of switches comprise:
   a first pair of switches corresponding to a first output node of the inverter;
   a second pair of switches corresponding to a second output node of the inverter; and
   a third pair of switches corresponding to a third output node of the inverter.

9. The computer-implemented method of claim 1, wherein the operations further comprise determining an angle shift based on the system state information of the vehicle.

10. The computer-implemented method of claim 9, wherein determining the plurality of control signals is further based on the angle shift.

11. A vehicle comprising:
    an electric motor;
    an inverter;
    data processing hardware; and
    memory hardware in communication with the data processing hardware, the memory hardware storing instructions that when executed on the data processing hardware cause the data processing hardware to perform operations comprising:
       receiving voltage vector command values for the electric motor operating in a linear modulation region;
       receiving system state information of the vehicle;
       determining that an overmodulation threshold is satisfied based on the system state information of the vehicle;
       based on determining that the overmodulation threshold is satisfied:
          determining a modulation factor from a modulation index;
          generating a three-phase output based on the voltage vector command values and the modulation factor, the three-phase output corresponding to the electric motor operating in an overmodulation region; and
          determining a plurality of control signals based on the three-phase output, each respective control signal of the plurality of control signals corresponding to a respective switch among a plurality of switches of the inverter; and
       instructing the plurality of switches of the inverter to control operation of the electric motor in the overmodulation region based on the plurality of control signals.

12. The vehicle of claim 11, wherein the operations further comprise:
    determining a time period that the electric motor has been operating in the overmodulation region;
    determining that the time period satisfies a threshold time period; and based on determining that the time period satisfies the threshold time period, instructing the electric motor to cease operating in the overmodulation region and operate in the linear modulation region.

13. The vehicle of claim 11, wherein generating the three-phase output comprises generating the three-phase output using a fixed-magnitude value.

14. The vehicle of claim 11, wherein the system state of the vehicle comprises as least one of:
- a torque request;
- a brake request;
- a traction control request;
- a collision avoidance request;
- a battery limp request; or
- a global position system (GPS) signal of the vehicle.

15. The vehicle of claim 11, wherein determining that the overmodulation threshold is satisfied based on the system state information of the vehicle comprises determining that a rate of change of a torque request satisfies the overmodulation threshold.

16. The vehicle of claim 11, wherein determining that the overmodulation threshold is satisfied based on the system state information of the vehicle comprises determining a collision avoidance request satisfies the overmodulation threshold.

17. The vehicle of claim 11, wherein the modulation factor corresponds to a maximum output voltage applied at the electric motor.

18. The vehicle of claim 11, wherein the plurality of switches comprise:
- a first pair of switches corresponding to a first output node of the inverter;
- a second pair of switches corresponding to a second output node of the inverter; and
- a third pair of switches corresponding to a third output node of the inverter.

19. The vehicle of claim 11, wherein the operations further comprise determining an angle shift based on the system state information of the vehicle.

20. The vehicle of claim 19, wherein determining the plurality of control signals is further based on the angle shift.

* * * * *